(12) United States Patent
Payor et al.

(10) Patent No.: US 10,942,371 B2
(45) Date of Patent: Mar. 9, 2021

(54) ROTATIONALLY STABILIZED CONTACT LENS

(71) Applicant: OneFocus Vision, Inc., Fernandina Beach, FL (US)

(72) Inventors: Rick Payor, Cumming, GA (US); Stephane Gobron, Irvine, CA (US); Ben Lubberman, HD Wierden (NL); Steve Waite, Fernandina Beach, FL (US)

(73) Assignee: OneFocus Vision, Inc., Fernandina Beach, FL (US)

( * ) Notice: Subject to any disclaimer, the term of this patent is extended or adjusted under 35 U.S.C. 154(b) by 91 days.

(21) Appl. No.: 15/973,972

(22) Filed: May 8, 2018

(65) Prior Publication Data

US 2019/0049749 A1     Feb. 14, 2019

Related U.S. Application Data

(63) Continuation of application No. PCT/US2016/061697, filed on Nov. 11, 2016.
(Continued)

(51) Int. Cl.
    *G02C 7/04*      (2006.01)
    *G02C 7/06*      (2006.01)
(Continued)

(52) U.S. Cl.
CPC .............. *G02C 7/048* (2013.01); *G02C 7/028* (2013.01); *G02C 7/083* (2013.01); *G02C 7/085* (2013.01); *B29D 11/00028* (2013.01)

(58) Field of Classification Search
CPC .......... G02C 7/04; G02C 7/041; G02C 7/048; G02C 7/049; G02C 7/085
(Continued)

(56) References Cited

U.S. PATENT DOCUMENTS 9,910,296 B2    3/2018   Harant
2005/0099595 A1*   5/2005   Lindacher ................ C07K 1/22
                                                                    351/159.09
(Continued)

FOREIGN PATENT DOCUMENTS

WO          9110154         7/1991
WO    2014117173 A2     7/2014
(Continued)

OTHER PUBLICATIONS

Copending U.S. Appl. No. 15/972,900, filed May 7, 2018.
(Continued)

*Primary Examiner* — Darryl J Collins
(74) *Attorney, Agent, or Firm* — Fisherbroyles, LLP; John K. Shimmick

(57) ABSTRACT

The stabilized contact lens methods and apparatus disclosed herein provide improved stabilization of a contact lens placed on a cornea of an eye. The contact lens comprises stabilization zones that allow the lens to repeatedly and consistently orient on the cornea such that a sensing zone located on the lower portion of the lens is located inferiorly to engage the lower eyelid. The stabilized contact lens can provide a lower pressure sensing zone with decreased thickness for pressure or other sensing related to the lower eyelid. The decreased thickness has the advantage of improving coupling between forces from an eyelid and a lower chamber of a fluidic module. The improved coupling allows increased amounts of fluid to move between the lower chamber and an upper optical chamber coupled to the lower chamber, such that the upper chamber can increase curvature and optical power in response to pressures of the eyelid.

25 Claims, 7 Drawing Sheets

Related U.S. Application Data

(60) Provisional application No. 62/255,242, filed on Nov. 13, 2015, provisional application No. 62/254,080, filed on Nov. 11, 2015.

(51) Int. Cl.
*G02C 7/08* (2006.01)
*G02C 7/02* (2006.01)
*B29D 11/00* (2006.01)

(58) Field of Classification Search
USPC .......................... 351/159.19, 159.34
See application file for complete search history.

(56) References Cited

U.S. PATENT DOCUMENTS

| | | | |
|---|---|---|---|
| 2010/0121443 A1* | 5/2010 | Michel | A61F 2/1627 623/6.22 |
| 2011/0085131 A1 | 4/2011 | Gupta | |
| 2011/0184271 A1 | 7/2011 | Veciana | |
| 2012/0026597 A1 | 2/2012 | Pugh | |
| 2015/0133878 A1 | 5/2015 | De Juan, Jr. | |
| 2015/0146160 A1 | 5/2015 | Jubin | |
| 2015/0370093 A1 | 12/2015 | Waite | |
| 2016/0004098 A1 | 1/2016 | Waite | |
| 2016/0018671 A1 | 1/2016 | Waite | |
| 2016/0377887 A1 | 12/2016 | Waite | |
| 2017/0131570 A1 | 5/2017 | Thompson | |
| 2017/0131571 A1 | 5/2017 | Waite | |
| 2018/0173010 A1 | 6/2018 | Harant | |
| 2018/0203251 A1* | 7/2018 | Goto | G02C 7/04 |

FOREIGN PATENT DOCUMENTS

| | | |
|---|---|---|
| WO | 2014120928 A2 | 8/2014 |
| WO | 2014161002 | 10/2014 |
| WO | 2015015205 | 2/2015 |
| WO | 2015095891 A1 | 6/2015 |
| WO | 2016019346 | 2/2016 |
| WO | 2016019351 | 2/2016 |
| WO | 2016019359 | 2/2016 |
| WO | 2017083770 | 5/2017 |
| WO | 2017083771 | 5/2017 |
| WO | 2017083774 | 5/2017 |
| WO | 2018089699 | 5/2018 |

OTHER PUBLICATIONS

Copending U.S. Appl. No, 15/988,738, filed May 24, 2018.
International Search Report and Written Opinion for International Application No. PCT/US2016/061697.

* cited by examiner

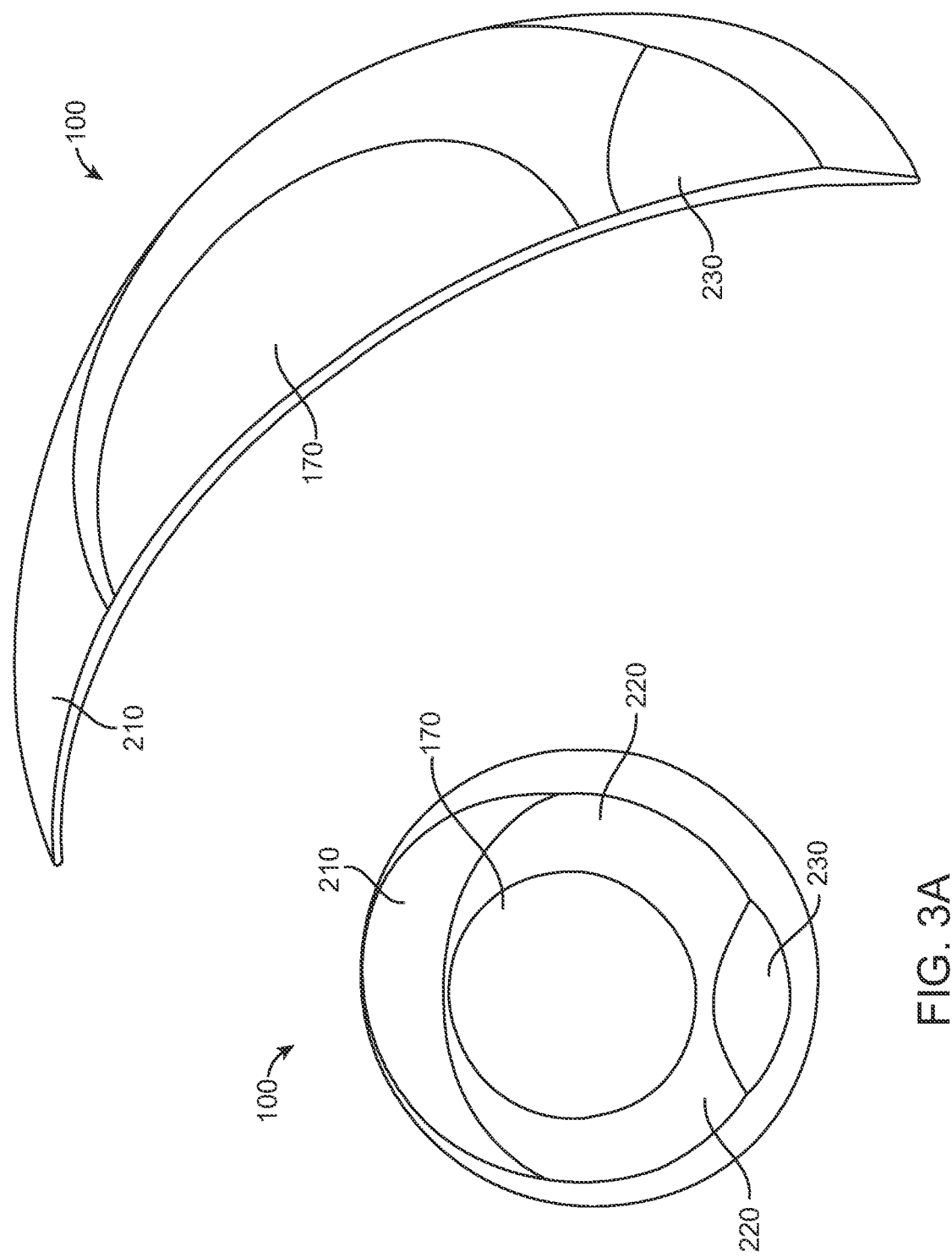

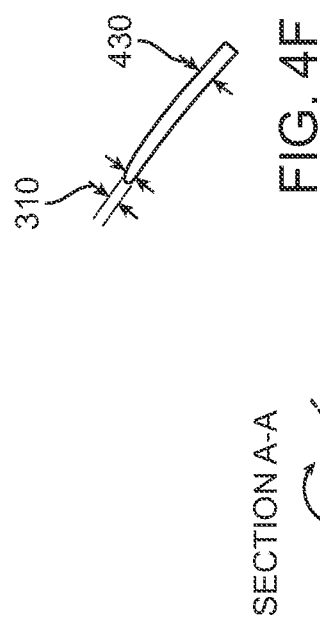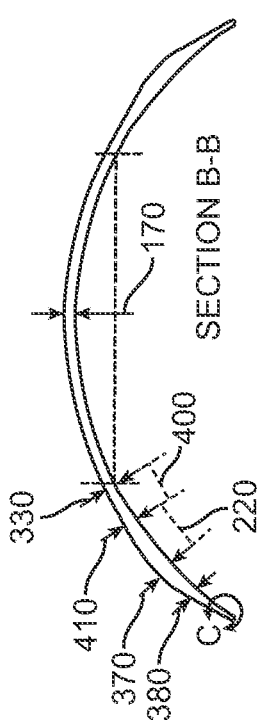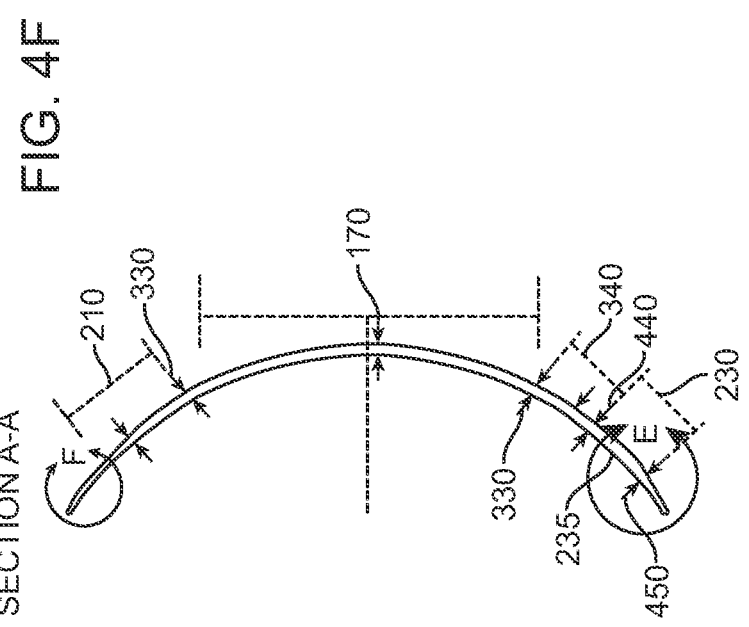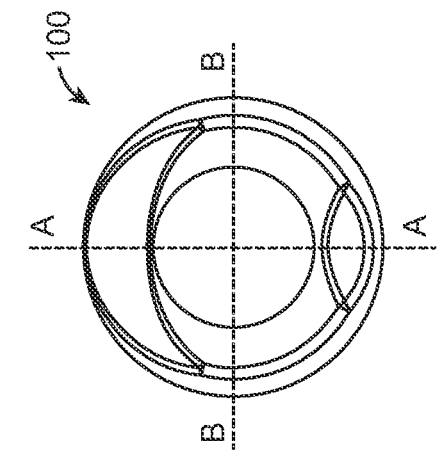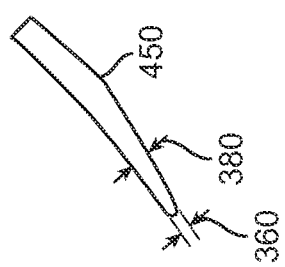

ROTATIONALLY STABILIZED CONTACT LENS

CROSS-REFERENCE

This application is a continuation of PCT Application PCT/US2016/061697, filed Nov. 11, 2016, entitled "ROTATIONALLY STABILIZED CONTACT LENS", which claims the benefit of U.S. Provisional Application Nos. 62/255,242, filed Nov. 13, 2015, entitled "ROTATIONALLY STABILIZED CONTACT LENS", and 62/254,080, filed Nov. 11, 2015, entitled "ROTATIONALLY STABILIZED CONTACT LENS", which applications are incorporated herein by reference.

The subject matter of the present application is related to the following patent applications: PCT/US2014/013427, filed on Jan. 28, 2014, entitled "Accommodating Soft Contact Lens"; PCT/US2014/013859, filed on Jan. 30, 2014, entitled "Manufacturing Process of an Accommodating Contact Lens"; PCT/US2014/071988, filed on Dec. 22, 2014, entitled "Fluidic Module For Accommodating Soft Contact Lens"; U.S. Application Ser. No. 62/031,324, filed Jul. 31, 2014, entitled "Sacrificial Molding Process for an Accommodating Contact Lens"; PCT/US2015/0433307, filed 31 Jul. 2015, entitled "LOWER LID ACTIVATING AN ELECTRONIC LENS"; PCT/US2016/061696, filed Nov. 11, 2016, entitled "SOFT CONTACT LENS MATERIAL WITH LOW VOLUMETRIC EXPANSION UPON HYDRATION"; and PCT/US2016/061700, filed Nov. 11, 2016, entitled "ACCOMMODATING LENS WITH CAVITY"; the entire disclosures of which are incorporated herein by reference.

The subject matter of the present application is also related to the following provisional patent applications filed on Nov. 11, 2015: U.S. Prov. Ser. App. No. 62/254,048, entitled "SOFT CONTACT LENS MATERIAL WITH LOW VOLUMETRIC EXPANSION UPON HYDRATION"; U.S. App. Ser. No. 62/254,080, entitled "ROTATIONALLY STABILIZED CONTACT LENS"; and U.S. Prov. Ser. App. No. 62/254,093, entitled "ACCOMMODATING LENS WITH CAVITY", the entire disclosures of which are incorporated herein by reference.

BACKGROUND OF THE INVENTION

As the eye ages, the ability to accommodate or increase in power for near vision deteriorates. By age 40, and on average by age 45, many people need some type of vision correction to see near objects.

Prior methods and apparatus for restoring accommodation are can be less than ideal in some respects. Although accommodating contact lenses have been proposed, at least some of these contact lenses have less than ideal alignment on the eye. With fluidic accommodating soft contact lenses, the eyelid can urge fluid from a lower portion of the lens to a central portion to increase curvature of the central portion for near vision.

Soft contact lenses normally rotate freely on the eye so a method to stabilize the rotation of lens is needed for the correction of astigmatism. Although stabilized contact lenses have been proposed for vision correction of astigmatism, these prior approaches for stabilization are less than ideally suited for use with accommodating contact lenses. These lenses are commonly called soft toric contact lenses. A method to rotationally stabilize commercial soft contact lenses to correct astigmatism is to use thin and thick zones, the variations in lens thickness, to interact with the eyelids.

The early designs using asymmetrical thickness were created using a simple tilt between the front and back surface of the soft contact lens. This tilt being the same as an optical prism, with a thin top and thick bottom, and the term "prism ballast" has been used to describe these lenses. While the thicker 'bottom' is heavier than the thinner 'top' of the lens the lenses have been shown to orient independent of gravity and dependent upon the force of the upper eyelid upon blinking. This orientation independent of gravity can be described "as the watermelon seed principle". Contemporary literature may still use the term "prism ballast", however, because of historical reference or because weight and gravity are a simpler concept than eyelid blink motions, pressure, compression and frictional forces. Prism can result in different amounts of thickness of lens material over an optical chamber within an optical zone of an accommodating contact lens, which may result in distortion of the central region when fluid is passed to the chamber in order to curvature of the central region.

In light of the above, improved accommodating contact lenses are needed with improved stabilization.

SUMMARY OF THE INVENTION

The stabilized contact lens methods and apparatus disclosed herein provide improved stabilization of a contact lens placed on a cornea of an eye. The contact lens comprises stabilization zones that allow the lens to repeatedly and consistently orient on the cornea such that a sensing zone located on the lower portion of the lens is located inferiorly to engage the lower eyelid. Although specific reference is made to an accommodating contact lens with a fluidic module, the embodiments disclosed herein can be used with any contact lens where stabilization is helpful. The stabilized contact lens can provide a lower pressure sensing zone with decreased thickness for pressure or other sensing related to the lower eyelid. The decreased thickness has the advantage of improving coupling between forces from an eyelid and a lower chamber of a fluidic module. The improved coupling allows increased amounts of fluid to move between the lower chamber and an upper optical chamber coupled to the lower chamber, such that the upper chamber can increase curvature and optical power in response to pressures of the eyelid. The improved stabilization helps to maintain the lower chamber toward the lower eyelid. The improved stabilization can be provided with an upper stabilization zone and a zone of increased thickness having increased thickness relative to the upper stabilization zone. The pressure sensing zone can be located over the lower chamber with decreased thickness relative to the zone of increased thickness to improve coupling of the pressure sensing zone to the lower eyelid. The stabilization provided with the upper stabilization zone and the zone of increased thickness can be sufficient to stabilize the lens with the decreased mass of the sensing zone. Each of the upper stabilization zone, the zone of increased thickness, and the pressure sensing zone may comprise fillets defining boundaries of the corresponding zones. The fillet boundaries can be arranged to provide stabilization, and may comprise portions of the stabilization zones. The central optical zone can be configured with decreased amounts of prism to improve accommodative response, and the amount of prism can be less than 0.4 D. The zone of increased thickness may extend substantially around the optical zone and comprise a zone of maximum thickness and a transition zone. The transition zone may extend between the zone of maximum thickness and the optical zone in order to provide a smooth transition from the zone of maximum thickness and the optical zone. The thicker portions of the transition zone adjacent the zone of maximum thickness may also contribute to stabilization of the lens. The transition zone may extend to the boundary of the optical zone and have a decreasing thickness profile from the zone of maximum thickness to the optical zone, such that a circular optical zone can be provided with decreased amounts of prism.

In a first aspect, an accommodating contact lens for placement on an eye is provided. The contact lens comprises an inner optical zone to provide variable optical power, an upper stabilization zone extending above the optical zone between an upper boundary of the lens and the optical zone, a zone of increased thickness extending below the upper stabilization zone, and a lower pressure sensitive zone coupled to the inner optical zone to engage a lower eyelid and increase optical power of the inner optical zone in response engagement with the lower eyelid. The zone of increased thickness comprises a thickness greater than the upper stabilization zone. The lower pressure sensitive zone comprises a thickness less than the zone of increased thickness.

In many embodiments, the upper stabilization zone and the zone of increased thickness each may comprise a surface area greater than the pressure sensing zone in order to stabilize the lens.

In many embodiments, the upper stabilization zone may comprise a crescent shape. The zone of increased thickness may comprise an annular shape extending at least partially around the central optical zone. The pressure sensitive zone may comprise a lentoid shape located between a lower boundary of the lens and the optical zone.

In many embodiments, a lower boundary of the zone of increased thickness may comprise an indentation shaped to fit the lentoid shape of the pressure sensitive zone between the zone of increased thickness and the lower boundary of the lens.

In many embodiments, the upper stabilization zone may comprise a thickness within a range from about 75 to 250 µm. The zone of increased thickness may comprise a thickness within a range from about 300-500 µm. The pressure sensitive zone may comprise a thickness within a range from about 50 to 300 µm.

In many embodiments, a difference in thickness between the upper stabilization zone and the zone of increased thickness may be within a range from about 150 µm to about 300 µm. The upper stabilization zone may comprise a surface area within a range from about 3 mm$^2$ to about 15 mm$^2$. The zone of increased thickness may comprise an area within a range from about 4 mm$^2$ to about 20 mm$^2$ having the difference in thickness within the range from about 150 to 300 µm, The pressure sensitive zone may comprise a surface area within a range from about 1 mm$^2$ to about 6 mm$^2$.

In many embodiments, the optical zone may comprise a center of the lens located along a midline of the lens. The pressure sensitive zone may be located along a midline of the lens corresponding to a 90 degree axis of the lens.

In many embodiments, the zone of increased thickness may comprise a first portion located on a first side of the lens and a second portion on a second side of the lens. The pressure sensitive zone may be located at least partially between the first portion and the second portion. The first portion and the second portion may comprise similar thicknesses greater than the thickness of the pressure sensitive zone, such that mass per unit area of the pressure sensitive zone is decreased relative to mass of the first portion and the second portion per unit area. The upper stabilization zone and the zone of increased thickness may be arranged to stabilize the contact lens upon engagement with a lower eyelid of the eye.

In many embodiments, the inner optical zone may comprise a central optical zone.

In many embodiments, the contact lens may further comprise a transition zone extending around the optical zone.

In many embodiments, the optical zone may comprise an inner portion and an outer portion. At least the inner portion may be configured to increase optical power in response to the lower eyelid engaging the pressure sensitive zone.

In many embodiments, the optical zone may comprise prism. The optical zone may comprise prism of less than 0.5 D. The optical zone may comprise prism of no more than one or more of 0.4 D, 0.3 D, 0.2 D or 0.1 D.

In many embodiments, the optical zone may comprise one or more of a fluidic chamber or liquid crystal In many embodiments, the zone of increased thickness may comprise a zone of maximum thickness and a transition zone. The transition zone may extend between the zone of maximum thickness and the optical zone. The transition zone may have a thickness profile extending to a uniform thickness around the central optical zone in order to provide the optical zone.

In many embodiments, the upper stabilization zone and zone of increased thickness each may comprise prism. The zone of increased thickness may comprise a zone of maximum thickness and a transition zone. The transition zone may extend between the zone of maximum thickness and the optical zone. The transition zone may have a thickness profile extending to a uniform thickness around the central optical zone in order to provide the optical zone with a boundary having a substantially constant thickness.

In many embodiments, the optical zone may comprise an optical fluidic chamber configured to increase curvature in response to eyelid pressure on the pressure sensing region. The pressure sensing region may comprise a fluidic reservoir chamber coupled to the optical chamber with a channel extending there-between to pass fluid to the optical chamber in response to eyelid pressure.

In many embodiments, the optical zone may comprise liquid crystal material between electrodes. The pressure sensing region may comprise a pressure sensor coupled to the electrodes with a circuit to increase optical power of the liquid crystal material in response to eyelid pressure sensed with the pressure sensor.

In many embodiments, a plurality of fillets may extend around one or more of the upper stabilization zone, the zone of increased thickness, the zone of maximum thickness, the transition zone, or the pressure sensing zone. For example, a plurality of fillets may extend around each of the upper stabilization zone, the zone of increased thickness, the zone of maximum thickness, the transition zone, and the pressure sensing zone. Alternatively or in combination, the plurality of fillets may define one or more boundaries of the one or more of the upper stabilization zone, the zone of increased thickness, the zone of maximum thickness, the transition zone, or the pressure sensing zone. The plurality of fillets may define boundaries of each of the upper stabilization zone, the zone of increased thickness, the zone of maximum thickness, the transition zone, or the pressure sensing zone. Alternatively or in combination, one or more of the upper stabilization zone, the zone of increased thickness, the zone of maximum thickness, the transition zone, or the pressure sensing zone may comprise the plurality of fillets.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 3A shows views of the stabilized contact lens of FIG. 2, in accordance with embodiments;

FIG. 3B shows a side profile illustration of the stabilized contact lens of FIG. 3A;

FIG. 4A shows a stabilized contact lens as in FIGS. 3A and 3B, in accordance with embodiments;

FIG. 4B shows a horizontal cross-sectional profile and thicknesses of the stabilized contact lens of FIG. 4A, in accordance with embodiments;

FIG. 4C shows rounded structure on the edge of the contact lens as in FIG. 4A, in accordance with embodiments;

FIG. 4D shows a vertical cross-sectional profile and thicknesses of the stabilized contact lens of FIG. 4A, in accordance with embodiments;

FIG. 4E shows a vertical cross-sectional profile and thicknesses of the pressure sensing zone of the stabilized contact lens of FIG. 4A, in accordance with embodiments;

FIG. 4F shows a vertical cross-sectional profile and thicknesses of the upper stabilization zone of the stabilized contact lens of FIG. 4A, in accordance with embodiments;

DETAILED DESCRIPTION OF THE INVENTION

The contact lens and related methods and apparatus are well suited for many types of contact lenses, such as accommodating soft contact lenses. Although specific reference is made to stabilized accommodating contact lenses with fluidic coupling, the stabilized contact lenses disclosed herein can be used with many types of contact lenses, rigid and soft contact lenses and accommodating contact lenses such as electronic contact lenses, accommodating electronic contact lenses, other types of accommodating contact lenses response to engagement with a lower eyelid. The fluidic contact lens comprises an inner optical chamber configured to increase optical power and a lower chamber fluidically coupled to the optical chamber to increase optical power when the lower chamber engages the lower eyelid. The inner optical chamber and the lower chamber can be coupled to each other with a channel such as a microchannel.

As used herein the term "lower" refers to inferior on the subject when the contact lens is placed and the subject is standing.

As used herein the term "upper" refers to superior on the subject when the contact lens is placed and the subject is standing.

The desired action of the accommodating contact lens is to increase power of the contact lens, for example, for reading by using the change in eye position of looking down to read.

Examples of accommodating contact lenses suitable for incorporation in accordance with embodiments disclosed herein are described in the following patent applications: PCT/US2014/071988, published as WO/2015/095891, entitled "FLUIDIC MODULE FOR ACCOMMODATING SOFT CONTACT LENS", filed 25 Jun. 2015; PCT/US2014/013859, published as WO/2014/120928, entitled "MANUFACTURING PROCESS OF AN ACCOMMODATING SOFT CONTACT LENS", filed 7 Aug. 2014; PCT/US2014/013427, published as WO/2014/117173, entitled "ACCOMMODATING SOFT CONTACT LENS", filed 31 Jul. 2014; PCT/US2015/0433307, filed 31 Jul. 2015, entitled "LOWER LID ACTIVATING AN ELECTRONIC LENS"; the entire disclosures of which are incorporated herein by reference.

Figure 1:
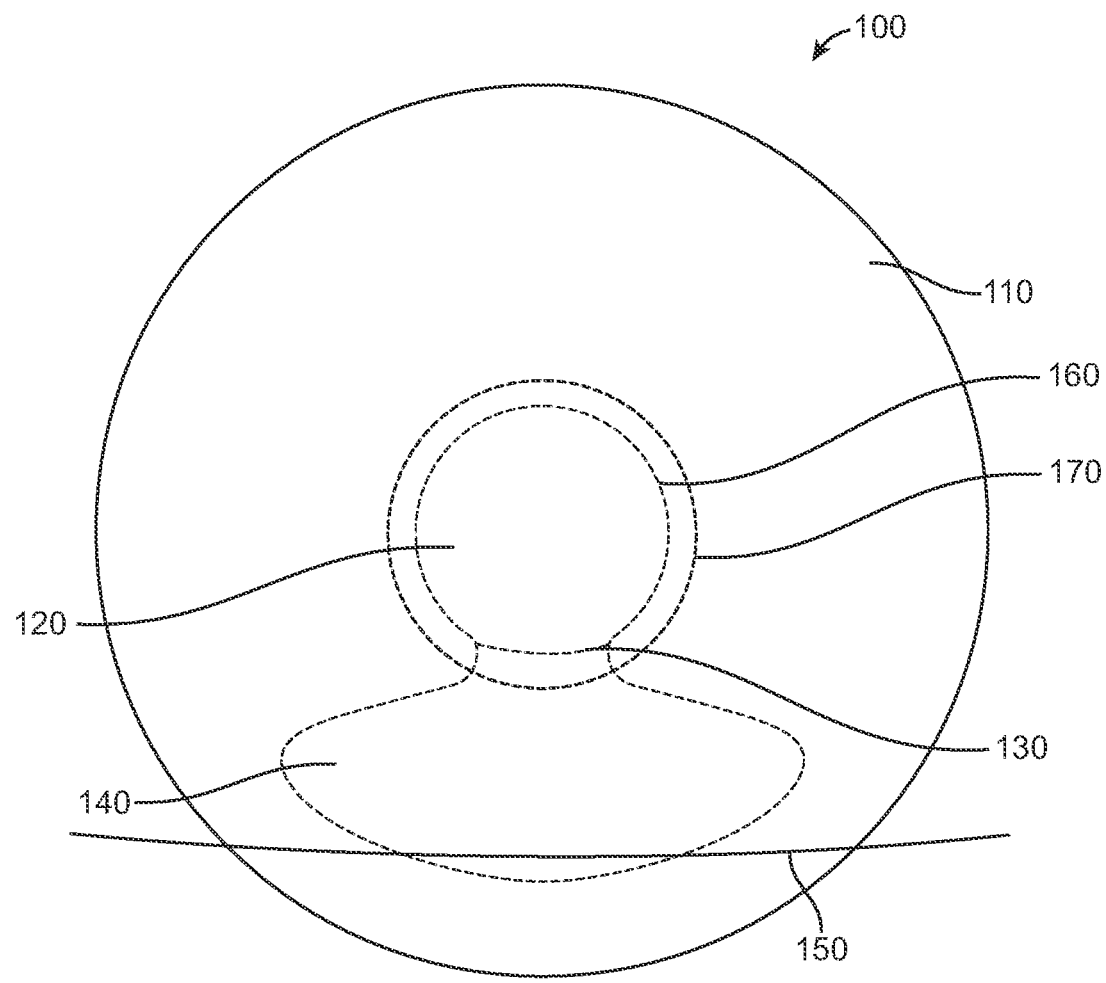
FIG. 1 shows an accommodating contact lens, in accordance with embodiments.

FIG. 1 shows an accommodating contact lens in accordance with embodiments.

In many embodiments, the soft contact lens 100 comprises components: (1) the encapsulating soft lens material 110 and an optional accommodating module 120. The accommodating module comprises two chambers connected by a channel 130. The outer lower chamber 140 takes the pressure of lower eyelid on the lens surface and converts it into chamber pressure that increases as the lower eyelid margin 150 rises (relative to the contact lens) from looking straight ahead (primary gaze) to looking down to read (down gaze position). The central optical chamber 160 increases the optical power of the lens when inflated by an increase in chamber pressure. Although an accommodation module is shown, the two chambers and channel can be formed within the contact lens material without a module, for example, by forming these structures in the soft contact lens material such that these structures are defined by the soft contact lens material.

The lens 100 comprises an optical zone 170 configured to provide variable optical power. Optical zone 170 may comprise one or more of a fluidic chamber or liquid crystal. Optical zone 170 is configured to provide far vision when the eyelid is away from the pressure sensitive zone. The optical zone 170 can be larger than the central optical chamber 160, for example.

The central optical chamber 160 can be positioned in many ways in relation to the contact lens in order to accommodate anatomical variability of the eye. For example, the central optical chamber 160 may be positioned within the soft contact lens 100 away from a center of the contact lens such that the central fluidic chamber 160 is concentric with the pupil. Alternatively, the central optical chamber 160 can be concentric with the contact lens 100. A person of ordinary skill in the art will recognize that the pupil may be located away from the center of the cornea and design the contact lens accordingly in accordance with the embodiments disclosed herein. This approach allows the center of the central optical chamber 160 to be centered on the pupil when the soft contact lens 100 is placed on the eye. The central optical chamber 160 may be concentric or eccentric within the soft contact lens 100, such as with respect to the center of the soft contact lens 100. The soft contact lens 100 may configured such that the optical zone 170 is concentric or eccentric with respect to the center of the soft contact lens 100. The soft contact lens 100 may be configured such that the optical zone 170 is concentric or eccentric with respect to the pupil of the eye.

The diameter or maximum dimension across of the optical zone 170 and/or central optical chamber 160 may be sized to match the pupil based on physiological norms. The diameter of the optical zone 170 or central optical chamber 160 may be within a range of about 2.5 mm to about 6 mm, for example within a range of about 3 mm to about 6 mm.

The desired accommodative action may be driven by the interaction between the lower chamber and lower eyelid. A method to maintain the orientation position of the lower chamber, within the soft contact lens, to be 'down' and in contact with the lower eye lid is also helpful.

The outer chamber 140 can be configured in many ways when connected to the central chamber 160 in order to provide accommodation. In many instances, the upper lid may contribute to the accommodation of the soft contact lens 100 as well. The upper lid may engage one or more of the fluid chambers during down-gaze or squinting, thereby compressing the fluid chamber(s) and altering the shape of at least the central fluidic chamber 160 in order to alter the optical power as described herein. The outer chamber 140 may be connected to the central chamber 160 and sized and shaped in many ways, for example with an annular outer chamber extending around the central optical chamber. Alternatively or in combination, the upper lid may engage one or more outer upper fluid chambers disposed above the central fluidic chamber 160. The upper fluid chamber(s) may be coupled to the central fluidic chamber 160 by an upper channel to allow fluid to flow between the upper fluid chamber(s) and the central fluidic chamber 160. The contact lens 100 may comprise any combination of a central fluidic chamber 160, an upper fluidic chamber, and a lower fluidic chamber 140. The contact lens 100 may, for example, comprise a central fluidic chamber 160 coupled to an upper fluidic chamber by an upper channel and a lower fluidic chamber 140 by a lower fluid channel as described herein. The contact lens 100 may alternatively comprise a central fluidic chamber 160 and one or more upper fluid chambers without a lower fluidic chamber 140. Engagement of the upper fluid chamber(s) with the upper eyelid may function to adjust the optical power of the contact lens 100 in a near vision configuration or far vision configuration in a manner substantially similar to that of the lower fluidic chamber(s) 140 described herein.

The accommodating soft contact lenses are well suited for the correction of astigmatism, which is achieved by two optical powers at 90 degrees apart as described by a toric surface. Each power has an axis and a power meridian. By convention either the axis of the most plus power (called plus cylinder notation) or the most minus power (called minus cylinder notation) is used to described optical orientation relative to the horizontal from zero to 179 degrees. The axis being symmetrical at 180 degrees. The refractive astigmatism of the eye is corrected by soft contact lenses of equal and opposite 'astigmatism' or toricity at the same axis. Soft contact lenses normally rotate freely on the eye so structures to stabilize the rotation of lens is helpful for the correction of astigmatism with the accommodating contact lenses as disclosed herein.

The rotationally stabilized soft contact lenses can use thick and thin zones, in which the variations in lens thickness interact with the eyelids to stabilize the lens. In some embodiments, asymmetrical thickness can be provided using a simple tilt between the front and back surface of the soft contact lens. This tilt may comprise optical prism, with a thin top and thick bottom. The optical zone can be configured without prism, such that the stabilizing zones with prism extend around the optical zone. While the thicker 'bottom' is heavier than the thinner 'top' of the lens the lenses are capable of orienting independent of gravity and dependent upon the force of the upper eyelid upon blinking. The embodiments disclosed herein can rely on one or more of eyelid blink motions, pressure, compression or frictional forces. In many embodiments, removed excess material from a lower pressure sensitive zone of the lens changes the center of gravity of the lens higher. Such lenses would be less stable if gravity was the mechanism of action. Actual clinical testing, however, has shown excellent stabilization characteristics supporting the thickness stabilization mechanism of action as disclosed herein. For the accommodating contact lens, a thickness profile design with a definite top and bottom is preferable as the lens has a single 'top' (away from the lower module) and 'bottom' (with lower module).

While the rotationally stabilized lens can be configured in many ways, in many instances the lens will have one or more of the following properties:

1) Thin top increasing in thickness to a maximum thickness just below the midline of the lens. The optimal thickness at the top of the lens is 0.100 mm, and 0.350 mm at the maximum, for a differential of at least about 0.200 mm, for example.

2) A substantially 'prism free' or uniform thickness across the optical zone. For example, less than a 10% variation in thickness of the encapsulating contact lens can be provided in front of the optically used portion of the module. In many instances, the amount of prism is no more than about 0.4 D.

3) A reduction in thickness over the center of the non-optically used outer lower module chamber. The thickness of the lens material of the pressure sensing zone over the outer lower module can be in a range from about 0.025 mm to about 0.2 mm, for example within a range from about 0.050 mm to about 0.0150 mm. An optimal thickness of 0.100 mm over the center of the outer/lower module chamber can be provided.

Figure 2:
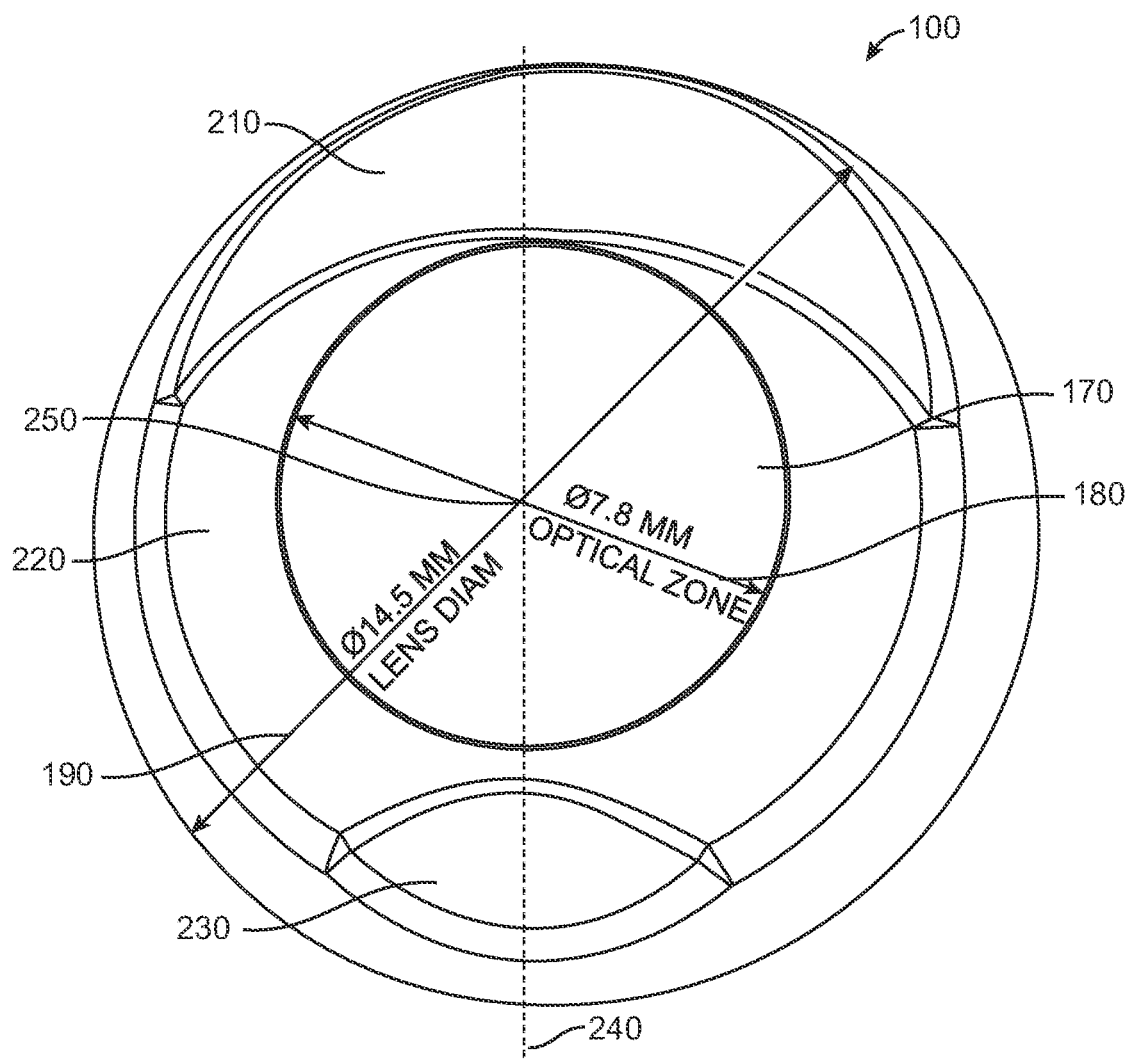
FIG. 2 shows a stabilized contact lens, in accordance with embodiments.

FIG. 2 shows structures of stabilized contact lens 100. Lens 100 comprises an arrangement of structures to stabilize the lens. An upper stabilization zone 210 is generally located above the optical zone 170. Upper stabilization zone 210 comprises a crescent shape. A zone of increased thickness 220 is located below the upper stabilization zone and extends substantially around the optical zone. Zone of increased thickness 220 comprises a generally annular shape and extends around at least about half of the optical zone. Zone of increased thickness 220 comprises an upper boundary shaped to fit and correspond to the lower boundary of the upper stabilization zone. The zone of increased thickness 220 comprises a thickness greater than the upper stabilization zone in order to stabilize the lens on the eye.

Lens 100 comprises a pressure sensitive zone 230 coupled to the optical zone 170. Pressure sensitive zone 230 comprises a lentoid shape with a thickness less than the zone of increased thickness 220, in order to couple pressure from the eyelid to a pressure sensitive structure within the pressure sensitive zone. Pressure sensitive zone 230 is generally located between the lower boundary of the lens and the optical zone 170. The zone of increased thickness 220 comprises a lower boundary shaped to fit and correspond to the upper boundary of the pressure sensitive zone 230. Lens 100 comprises a midline 240 extending through a center 250 and corresponding to a 90 degree axis of the lens 100. The stabilizing structures of the lens can be symmetrically disposed about the midline 240.

Optical zone 170 may comprise a pressure sensor or lower chamber fluidic module coupled to the pressure sensing zone 230 as described in application PCT/US2014/071988, previously incorporated by reference herein.

Optical zone 170 may comprise an optical fluidic chamber configured to increase curvature in response to eyelid pressure on the pressure sensing zone 230. The pressure sensing zone 230 comprises a fluidic reservoir chamber coupled to the optical chamber with a channel extending there-between to pass fluid to the optical chamber in response to eyelid pressure.

In an alternative embodiment, optical zone 170 may comprise a liquid crystal material between electrodes with the pressure sensing zone 230 comprising a pressure sensor coupled to the electrodes with a circuit to increase optical power of the liquid crystal material in response to eyelid pressure sensed with the pressure sensor.

The optical zone 170 comprises a maximum dimension across, such as a diameter 180 of the optical zone. The lens 100 comprises a maximum dimension across, such as diameter 190. The optical zone can be sized in many ways, and can be within a range from about 3 mm to about 9 mm, for example within a range from about 5 mm to about 8 mm.

The upper stabilization zone 210 and zone of increased thickness 220 may each comprise a surface area greater than the pressure sensing zone in order to stabilize the lens.

FIG. 3A shows views of the stabilized contact lens of FIG. 2. The upper stabilization zone 210 of lens 100 comprises a thinner section which ramps up in thickness from top to bottom. This provides the inclined plane effect for the upper eyelid to orient the lens with zone of greater thickness down, away, from the eyelid during blinking. The upper stabilization zone comprises a thickness within a range from about 75 to 250 µm. The zone of increased thickness 220 comprises a thicker section with thickness within a range from about 300 to 500 µm (micrometers), for example. The difference in thickness between the upper stabilization zone 210 and the zone of increased thickness can be in a range from about 150 to 300 µm, for example. The pressure sensitive zone 230 comprises a thickness within a range from about 50 to 300 µm, for example.

The upper stabilization zone 210 may comprise a surface area within a range from about 3 to 15 mm$^2$ and the zone of increased thickness 220 may comprise a surface area within a range from about 3 to 20 mm$^2$, for example. The pressure sensitive zone 230 may comprise a surface area within a range from about 1 to 6 mm$^2$.

FIG. 3B shows a side profile illustration of the stabilized contact lens of FIG. 3A.

Figure 3C:
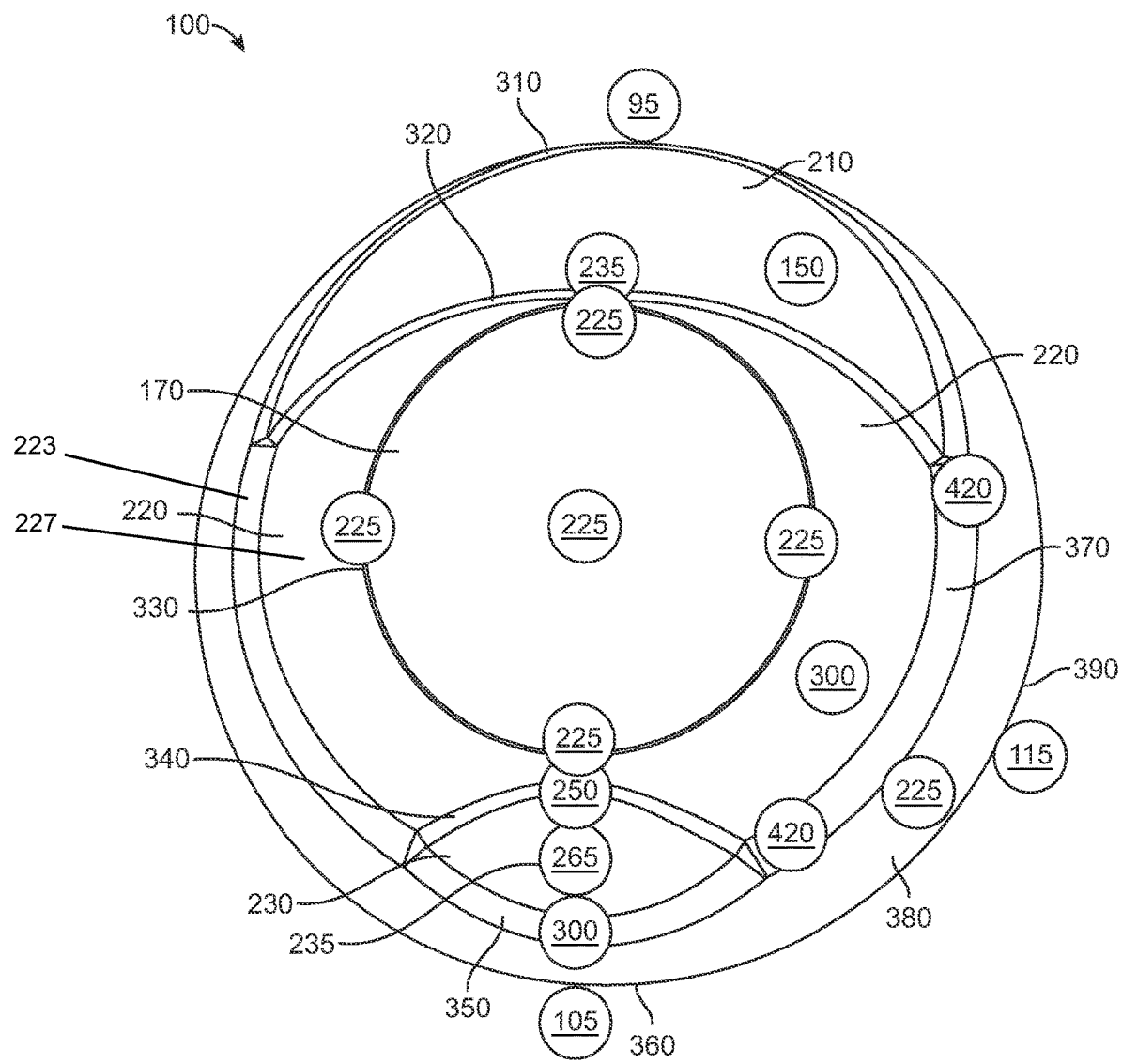
FIG. 3C shows thickness at locations of the lens as in FIGS. 3A and 3B.

FIG. 3C shows thickness at locations of a −1.00 Diopter lens as in FIGS. 3A and 3B. The thickness of the upper stabilization zone 210 may be about 150 µm, with the thickness of the lens tapering down to about 100 µm at the upper lens edge 310. The fillet 320 at transition between the lower edge of the upper stabilization zone 210 and the upper edge of the optical zone may have an increased thickness of about 235 µm. The thickness of the central optical zone 170 may be about 225 µm until the outer edge 330, at which point the thickness increases to about 230 µm. The thickness of the central optical zone can vary in accordance with the refractive correction of the lens, and may comprise an anterior toric surface, for example. The zone of increased thickness 220 may have a thickness of about 300 µm, which may increase to about 420 µm in the fillet 370 at the transition between the outer edge of the zone of increased thickness 220 and the surrounding outer lens 380, which may have a thickness of about 225 µm and taper down to about 115 µm at the outer edge 390 of the lens 100, for example. The pressure sensitive zone 230 may have a center 235 having a thickness of 265 µm, with a thinner upper edge fillet 340 having a thickness of about 250 µm at the transition to the zone of increased thickness or optical zone (depending on the configuration), and thicker at lower edge fillet 350 at about 300 µm where the pressure sensitive zone 230 transitions into the surrounding outer lens 380. The pressure sensitive zone is located between fillet 340 and fillet 350, which may comprise a decreased thickness between the upper fillet and the lower fillet. The lower lens edge 360 further tapers down to about 105 µm.

The optical zone 170 may comprise prism of less than 0.5 D. Preferably, the optical zone 170 comprises prism of no more than one or more of 0.4 D, 0.3 D, 0.2 D, or 0.1 D. The optical zone can be sized in many ways and comprises a maximum dimension across, such as a diameter, within a range from about 4 to 8 mm, for example.

Alternatively, the optical zone may comprise at least some prism.

The zone of increased thickness 220 may extend substantially around the optical zone and comprise a transition zone 227 and a zone of maximum thickness 223. The zone of maximum thickness 223 comprises a thickness within a range having values that are greater than other regions of the lens. The zone of maximum thickness 223 may comprise an annular zone extending at least partially around the optical zone, and may be symmetrically disposed about a midline of the lens extending through the optical zone of the lens and pressure sensing portion of the lens. The zone of maximum thickness may comprise one or more fillets in order to provide a smooth surface for the eyelid to slide over this zone. The transition zone extends between the zone of maximum thickness and optical zone and may comprise a thickness profile extending from the zone of maximum thickness to a uniform thickness around the outer boundary of the central optical zone 170.

The upper stabilization zone 210 and zone of increased thickness 230 may each comprise prism, wherein the zone of increased thickness 220 extends around the optical zone 170 and comprises a transition zone having a shape profile extending to a uniform thickness around the central optical zone 170 in order to provide the optical zone 170 with a boundary having a substantially constant thickness and circular profile for lenses with spherical correction. The transition zone may have a varying thickness around the central optical zone in order to accommodate non-spherical shapes of the central optical zone, such as toric or wavefront and other corrective shapes.

The optical prism of the upper stabilization zone and the zone of increased thickness can be configured in many ways, for example with center of curvature located off axis away from a center of curvature of the back radius of curvature, for example.

In many embodiments, the upper stabilization zone comprises the fillets as described herein, which define a boundary of the upper stabilization zone. The zone of increased thickness may also comprise fillets as described herein, which define a boundary of the zone of increased thickness. The pressure sensing zone may also comprise fillets as described herein and be bounded by fillets, which define a boundary of the pressure sensitive zone. The zone of increased thickness and pressure sensing zone may comprise a common fillet shaped to fit the pressure sensing zone beneath the zone of increased thickness.

The zone of increased thickness can be configured in many ways and may comprise the fillets that define its boundary, and also a transition zone extending within the zone of increased thickness to the optical zone in order to provide a substantially uniform thickness around the outer boundary of the optical zone. The substantially uniform thickness around the outer boundary of the optical zone can allow a spherical optical zone to have a circular diameter. With the optical zone shaped to define toric lenses, the transition zone can be shaped with a varying thickness profile around a circular optical zone in order to provide a circular diameter to the toric optical zone.

FIG. 4A shows a stabilized contact lens 100 as in FIGS. 3A and 3B.

FIG. 4B shows a horizontal cross-sectional profile and thicknesses of the stabilized contact lens of FIG. 4A. The center of the optical zone 170 may have a thickness of 225 µm, with an outer edge 330 having a thickness of around 235 µm, for example. Embodiments may include a transition zone 400 extending around outer edge 330 of the optical zone 170 from the optical zone to the zone of increased thickness 220. The outer edge 410 of the transition zone 400 may have a thickness of 290 µm, for example.

The optical zone may comprise an inner and an outer portion with at least the inner portion configured to increase optical power in response to the lower eyelid engaging the pressure sensitive zone 230 as described herein.

From the outer edge 410 of the transition zone 400, the thickness of the lens increases within the zone of increased thickness 220, reaching a maximal thickness of about 420 µm at fillet 370 between zone of increased thickness 220 and surrounding outer lens 380. The surrounding outer lens 380 has a taper and decreased thickness compared to fillet 370, for example 255 µm.

FIG. 4C shows rounded structures on the edge of the contact lens as in FIG. 4A. Continuing outward from the structure shown in FIG. 4B, the surrounding outer lens 380 may decrease until it reaches a final thickness of 115 µm at the rounded or beveled structures 420 of the outer lens edge 390.

FIG. 4D shows a vertical cross-sectional profile and thicknesses of the stabilized contact lens of FIG. 4A.

The upper stabilization zone 210 may have a central thickness of 175 µm with its upper edge thickness decreasing to 140 µm. The optical zone 170 may have a central thickness of 225 µm and a slightly higher thickness at its outer edges 330, for example, which can vary with the curvature of the lens. Below the optical zone 170, the lower edge 440 of fillet 340 may comprise a thickness of about 235 µm at the transition into the pressure sensitive zone 230. The thickness of the pressure sensitive zone may increase between lower edge 440 and a center 235 of the pressure sensitive zone, and increase further until it reaches a maximal thickness of about 300 µm at the edge 450 of boundary fillet 350 positioned at the transition between the pressure sensitive zone 230 and surrounding outer lens 380. The increased thickness of the lower edge 450 of the pressure sensing portion relative to the thickness of the center of the pressure sensing zone can provide improved stability and improved pressure sensing.

FIG. 4E shows a vertical cross-sectional profile and thicknesses of the pressure sensing zone of the stabilized contact lens of FIGS. 4A and 4D.

Continuing past fillet edge 450, the surrounding outer lens 380 decreases in thickness, in this instance to about 205 µm, before tapering down further at the lower lens edge 360 to a final thickness of about 115 µm.

FIG. 4F shows a vertical cross-sectional profile and thicknesses of the upper stabilization zone of the stabilized contact lens of FIG. 4A.

The upper edge 430 of the upper stabilization zone 210 may decrease to a thickness of about 140 µm. Continuing past the upper stabilization zone 210, lens thickness may further decrease towards the upper lens edge 310, reaching a final thickness of about 115 µm.

Figure 5:
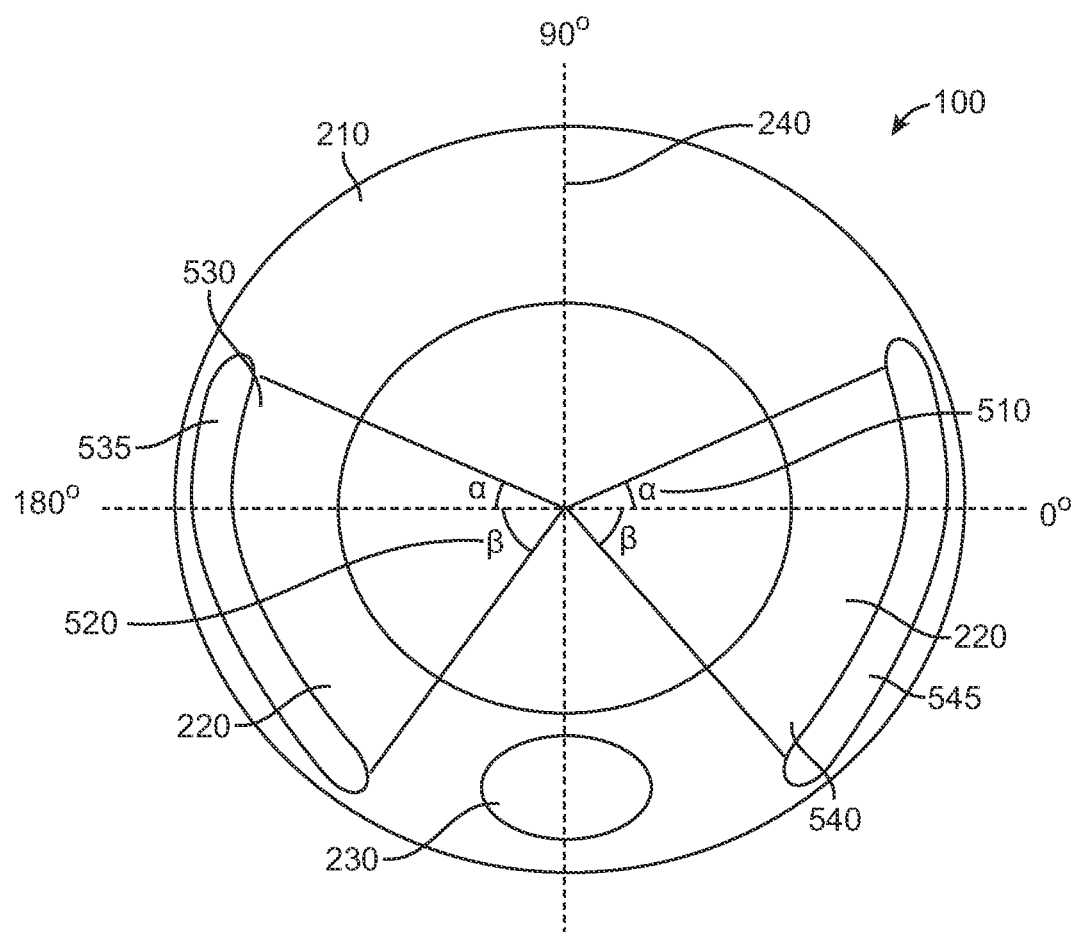
FIG. 5 shows a stabilized lens, in accordance with embodiments.

FIG. 5 shows stabilized lens 100, which may comprise an optical zone as described herein.

The lower stabilizing zone 220 may comprise a first portion 530 located on a first side of the lens midline 240 and a second portion 540 on a second side of the lens midline. The pressure sensitive zone 230 is located at least partially between the first portion 530 and second portion 540. The first portion 530 may comprise a first fillet 535, and the second portion 540 may comprise a second fillet 545. The upper stabilization zone 210 and the zone of increased thickness 220 are arranged to stabilize the contact lens upon engagement with a lower eyelid of the eye as described herein.

The first portion 530 and second portion 540 comprise similar thicknesses which are greater than the thickness of the pressure sensitive zone 230 in order that the mass per unit area of the pressure sensitive zone is decreased relative to the mass per unit area of the two portions. The contact lens described with reference to FIGS. 2-4F can be similarly configured.

The first portion 530 and second portion 540 each comprise a surface area of at least about 1 mm$^2$. The pressure sensitive zone 230 comprises a surface area of at least about 0.1 mm$^2$. The contact lens described with reference to FIGS. 2-4F can be similarly configured.

The thick sections of the first portion 530 and second portion 540 are symmetrical with respect to the midline 240. An upwardly subtending angle alpha 510 may be between within a range from about 10 to about 40 degrees off the horizontal axis. A downwardly subtending angle beta 520 may be within a range from about 20 to about 75 degrees off the horizontal access.

Figure 6:
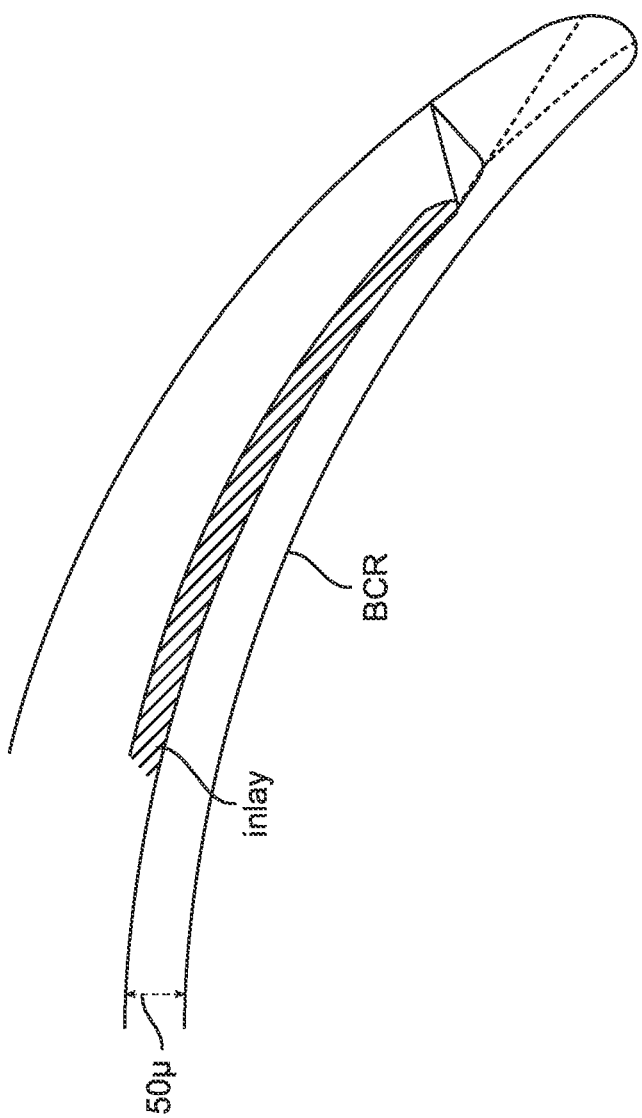
FIG. 6 shows an inlay comprising a module placed in a stabilized contact lens.

FIG. 6 shows an inlay placed in a stabilized contact lens. The inlay may comprise an inlay of an accommodating module or electronic circuit, or a combination thereof, for example. The inlay can be positioned at a distance within a range from about 25 µm to about 100 µm, for example about 50 µm, from a back surface of the contact lens. The back surface of the contact lens has a back radius of curvature BCR. Alternatively, the module could be positioned at a distance within a range from about 25 to about 100 µm from the front surface of the lens.

Although reference is made to soft contact lenses comprising a module, accommodating contact lenses can be configured without a module, in which the soft contact lens comprises the central optical chamber and the outer lower chamber with the channel in between. Each of these structures may comprise cavities formed in the contact lens, in which the interconnected cavities contain a fluid with an index of refraction greater than the contact lens material.

Examples of modules and sensors suitable for incorporation with the stabilized contact lens as disclosed herein are described in PCT/US2014/013427, filed on 28 Jan. 2014, entitled "Accommodating Soft Contact Lens"; PCT/US2014/013859, filed on Jan. 30, 2014, entitled "Manufacturing Process of an Accommodating Contact Lens"; PCT/US2014/071988, filed on Dec. 22, 2014, entitled "Fluidic Module For Accommodating Soft Contact Lens"; and PCT/ US2015/0433307, filed 31 Jul. 2015, entitled "LOWER LID ACTIVATING AN ELECTRONIC LENS"; the entire disclosures of which have been previously incorporated herein by reference. For example, the lens may comprise a self-supporting electronics module comprising circuitry embedded in the hydrogel material of the stabilized contact lens as disclosed herein.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An accommodating contact lens for placement on an eye, comprising:
   an optical zone to provide variable optical power, a horizontal axis extending though a center of the optical zone;
   an upper stabilization zone extending above the optical zone and the horizontal axis, between an upper boundary of the lens and the optical zone;
   a zone of increased thickness extending below the upper stabilization zone, the zone of increased thickness comprising a thickness greater than the upper stabilization zone and having an upper end above the horizontal axis and a lower end below the horizontal axis, the upper end subtending a first angle with respect to the horizontal axis and the lower end subtending a second angle with respect to the horizontal axis, the first angle being smaller than the second angle; and
   a lower pressure sensitive zone coupled to the optical zone to engage a lower eyelid and increase optical power of the optical zone in response engagement with the lower eyelid, wherein the lower pressure sensitive zone comprises a thickness less than the zone of increased thickness.

2. The contact lens of claim 1, wherein the upper stabilization zone and the zone of increased thickness each comprise a surface area greater than the pressure sensitive zone in order to stabilize the lens.

3. The contact lens of claim 1, wherein the upper stabilization zone comprises a crescent shape, the zone of increased thickness comprising an annular shape extending at least partially around the optical zone, the pressure sensitive zone comprising a lentoid shape located between a lower boundary of the lens and the optical zone.

4. The contact lens of claim 1, wherein a lower boundary of the zone of increased thickness comprises an indentation shaped to fit a lentoid shape of the pressure sensitive zone between the zone of increased thickness and the lower boundary of the lens.

5. The contact lens of claim 1, wherein the upper stabilization zone comprises a thickness within a range from about 75 to 250 µm, and the zone of increased thickness comprises a thickness within a range from about 300 to 500 µm and the pressure sensitive zone comprises a thickness within a range from about 50 to 300 µm.

6. The contact lens of claim 1, wherein a difference in thickness between the upper stabilization zone and the zone of increased thickness is within a range from about 150 µm to about 300 µm and wherein the upper stabilization zone comprises a surface area within a range from about 3 mm$^2$ to about 15 mm$^2$ and the zone of increased thickness comprises an area within a range from about 4 mm$^2$ to about 20 mm$^2$ having the difference in thickness within the range from about 150 to 300 µm and wherein the pressure sensitive zone comprises a surface area within a range from about 1 mm$^2$ to about 6 mm$^2$.

7. The contact lens of claim 1, wherein the optical zone comprises a center of the lens located along a midline of the lens and wherein the pressure sensitive zone is located along a midline of the lens corresponding to a 90 degree axis of the lens.

8. The contact lens of claim 1, wherein the zone of increased thickness comprises a first portion located on a first side of the lens and a second portion on a second side of the lens and wherein the pressure sensitive zone is located at least partially between the first portion and the second portion.

9. The contact lens of claim 8, wherein the first portion and a second portion comprise similar thicknesses greater than the thickness of the pressure sensitive zone, such that mass per unit area of the pressure sensitive zone is decreased relative to mass of the first portion and the second portion per unit area and wherein the upper stabilization zone and the zone of increased thickness are arranged to stabilize the contact lens upon engagement with a lower eyelid of the eye.

10. The contact lens of claim 1, wherein the optical zone comprises a central optical zone.

11. The contact lens of claim 1, further comprising a transition zone extending around the optical zone.

12. The contact lens of claim 1, wherein the optical zone comprises an inner portion and an outer portion, at least the inner portion configured to increase optical power in response to the lower eyelid engaging the pressure sensitive zone.

13. The contact lens of claim 1, wherein the optical zone comprises prism of less than 0.5 D.

14. The contact lens of claim 1, wherein the optical zone comprises one or more of a fluidic chamber or liquid crystal.

15. The contact lens of claim 1, wherein the zone of increased thickness comprises a zone of maximum thickness and a transition zone, wherein the transition zone extends between the zone of maximum thickness and the optical zone, the transition zone having a thickness profile extending to a uniform thickness around the optical zone in order to provide the optical zone.

16. The contact lens of claim 1, wherein the upper stabilization zone and zone of increased thickness each comprise prism and wherein the zone of increased thickness comprises a zone of maximum thickness and a transition zone, the transition zone extending between the zone of maximum thickness and the optical zone, the transition zone having a thickness profile extending to a uniform thickness around the optical zone in order to provide the optical zone with a boundary having a substantially constant thickness.

17. The contact lens of claim 1, wherein the optical zone comprises an optical fluidic chamber configured to increase curvature in response to eyelid pressure on the pressure sensitive zone and wherein the pressure sensitive zone comprises a fluidic reservoir chamber coupled to the optical chamber with a channel extending there-between to pass fluid to the optical chamber in response to eyelid pressure.

18. The contact lens of claim 1, wherein the optical zone comprises liquid crystal material between electrodes and the pressure sensing region comprises a pressure sensor coupled to the electrodes with a circuit to increase optical power of the liquid crystal material in response to eyelid pressure sensed with the pressure sensor.

19. The contact lens of claim 1, wherein a plurality of fillets extends around one or more of the upper stabilization zone, the zone of increased thickness, the zone of maximum thickness, the transition zone, or the pressure sensitive zone.

20. The contact lens of claim 1, wherein a plurality of fillets extends around each of the upper stabilization zone, the zone of increased thickness, the zone of maximum thickness, the transition zone, and the pressure sensitive zone.

21. The contact lens of claim 1, wherein the plurality of fillets defines one or more boundaries of the one or more of the upper stabilization zone, the zone of increased thickness, the zone of maximum thickness, the transition zone, or the pressure sensitive zone.

22. The contact lens of claim 21, wherein the plurality of fillets defines boundaries of each of the upper stabilization zone, the zone of increased thickness, the zone of maximum thickness, the transition zone, or the pressure sensitive zone.

23. The contact lens of claim 1, wherein one or more of the upper stabilization zone, the zone of increased thickness, the zone of maximum thickness, the transition zone, or the pressure sensitive zone comprise the plurality of fillets.

24. The contact lens of claim 1, wherein the first angle is within a range from about 10 to about 40 degrees.

25. The contact lens of claim 24, wherein the second angle is within a range from about 20 to about 75 degrees.

\* \* \* \* \*